(12) United States Patent
Katusic et al.

(10) Patent No.: US 8,906,983 B2
(45) Date of Patent: Dec. 9, 2014

(54) IRON-SILICON OXIDE PARTICLES HAVING AN IMPROVED HEATING RATE IN AN ALTERNATING MAGNETIC AND ELECTROMAGNETIC FIELD

(75) Inventors: Stipan Katusic, Bad Soden (DE); Peter Kress, Karlstein (DE); Peter Albers, Hanau (DE); Harald Herzog, Karlstein (DE)

(73) Assignee: Evonik Degussa GmbH, Essen (DE)

( * ) Notice: Subject to any disclaimer, the term of this patent is extended or adjusted under 35 U.S.C. 154(b) by 15 days.

(21) Appl. No.: 13/989,981

(22) PCT Filed: Dec. 7, 2011

(86) PCT No.: PCT/EP2011/072089
§ 371 (c)(1),
(2), (4) Date: May 28, 2013

(87) PCT Pub. No.: WO2012/103974
PCT Pub. Date: Aug. 9, 2012

(65) Prior Publication Data
US 2013/0303658 A1    Nov. 14, 2013

(30) Foreign Application Priority Data

Feb. 3, 2011    (EP) ..................................... 11153169

(51) Int. Cl.
| | | |
|---|---|---|
| *C09C 1/24* | (2006.01) | |
| *C08K 9/02* | (2006.01) | |
| *H01F 1/01* | (2006.01) | |
| *B82Y 30/00* | (2011.01) | |
| *C01G 49/00* | (2006.01) | |
| *C04B 35/628* | (2006.01) | |

(52) U.S. Cl.
CPC .. *H01F 1/01* (2013.01); *C08K 9/02* (2013.01); *B82Y 30/00* (2013.01); *C01G 49/00* (2013.01); *C01P 2002/60* (2013.01); *C01P 2002/70* (2013.01); *C01P 2004/64* (2013.01); *C01P 2004/84* (2013.01); *C01P 2006/12* (2013.01); *C04B 35/62807* (2013.01); *C04B 35/62884* (2013.01); *C04B 35/62894* (2013.01); *C04B 35/62897* (2013.01); *C04B 2235/3272* (2013.01); *C04B 2235/5409* (2013.01); *C04B 2235/5445* (2013.01); *C04B 2235/5454* (2013.01); *C04B 2235/549* (2013.01); *C09C 1/24* (2013.01)
USPC ......... 523/210; 523/200; 252/62.59; 427/215

(58) Field of Classification Search
CPC ......... C09C 1/24; H01F 1/01; C01P 2002/70; C08K 9/02
USPC ................. 523/200, 210; 252/62.59; 427/215
See application file for complete search history.

(56) References Cited

U.S. PATENT DOCUMENTS

| | | | |
|---|---|---|---|
| 2003/0198811 A1* | 10/2003 | Hayashi et al. | ............... 428/404 |
| 2011/0006247 A1 | 1/2011 | Katusic et al. | |
| 2011/0147641 A1 | 6/2011 | Meyer et al. | |
| 2011/0207869 A1 | 8/2011 | Katusic et al. | |
| 2012/0080637 A1 | 4/2012 | Herzog et al. | |
| 2012/0130023 A1 | 5/2012 | Herzog et al. | |

FOREIGN PATENT DOCUMENTS

| | | |
|---|---|---|
| CN | 101707106 A | 5/2010 |
| EP | 2 000 439 | 12/2008 |
| WO | 2010 063557 | 6/2010 |
| WO | 2010 149463 | 12/2010 |

* cited by examiner

*Primary Examiner* — Vickey Nerangis
(74) *Attorney, Agent, or Firm* — Oblon, Spivak, McClelland, Maier & Neustadt, L.L.P.

(57) ABSTRACT

Iron-silicon oxide particles with a core and an outer shell have improved heating rates in a magnetic field. The core contains maghemite, magnetite, and haematite. The outer shell is essentially or exclusively silicon dioxide. The crystallite diameter of the haematite determined by X-ray diffraction is greater than 120 nm. A ratio of the brightness of the Debye-Scherrer diffraction ring by electron diffraction at a lattice plane spacing of 0.20+/−0.02 nm, comprising maghemite and magnetite, to the brightness of the Debye-Scherrer diffraction ring by electron diffraction at a lattice plane spacing of 0.25+/−0.02 nm, comprising maghemite, magnetite and haematite, is no more than 0.2.

18 Claims, 1 Drawing Sheet

IRON-SILICON OXIDE PARTICLES HAVING AN IMPROVED HEATING RATE IN AN ALTERNATING MAGNETIC AND ELECTROMAGNETIC FIELD

The invention relates to iron-silicon oxide particles having an improved heating rate in a magnetic field, their production and their use.

WO 2010/063557 discloses iron-silicon oxide particles which can be used for inductively heating materials in an alternating magnetic or electromagnetic field. The particles have a core-shell structure with the iron oxide phases haematite, magnetite and maghemite as core, an amorphous shell of silicon dioxide and one or more compounds of the elements silicon, iron and oxygen present between shell and core. It is also disclosed that the core can comprise 1-10% by weight of haematite having a crystallite size of 20-120 nm, 20-50% by weight of magnetite having a crystallite size of 20-60 nm and 40-75% by weight of maghemite having a crystallite size of 15-50 nm. The particles are produced by reacting a mixture of silicon compounds of which one is monosilane and an iron compound in a hydrogen/oxygen flame.

It has been found that the simultaneous presence of the three iron oxide modifications is essential for achieving acceptable heating rates in inductive heating in an alternating magnetic or electromagnetic field. Nevertheless, it appeared to be desirable to improve the achievable heating rates further. However, the process disclosed in WO 2010/063557 does not allow the production of iron-silicon oxide particles which can perform this task.

The technical object of the present invention was therefore to provide iron-silicon oxide particles which are further improved in respect of the achievable heating rate. A further object was to provide a process for producing these particles.

The invention provides iron-silicon oxide particles which comprise a core and an outer shell, where the core contains the iron oxide modifications maghemite, magnetite and haematite and the outer shell consists essentially or exclusively of amorphous silicon dioxide, characterized in that a) $B_{0.20\ nm}/B_{0.25\ nm}$ is ≤0.2, preferably 0.05-0.20, particularly preferably 0.10-0.18, very particularly preferably 0.12-0.16, where $B_{0.20\ nm}$=brightness of the Debye-Scherrer diffraction ring determined by electron diffraction at a lattice plane spacing of 0.20+/−0.02 nm, comprising maghemite and magnetite, and $B_{0.25\ nm}$=brightness of the Debye-Scherrer diffraction ring determined by electron diffraction at a lattice plane spacing of 0.25+/−0.02 nm, comprising maghemite, magnetite and haematite, and b) the crystallite diameter of the haematite determined by X-ray diffraction is greater than 120 nm.

The outer shell of the particles of the invention is amorphous. For the purposes of the present invention, the term amorphous refers to a material in which no diffraction signals can be measured by the conventional methods of X-ray diffraction. The outer shell is an impermeable shell. For the purposes of the present invention, impermeable means that less than 50 ppm of iron can be detected on contact of the particles with hydrochloric acid under particular reaction conditions. Here, 0.33 g of the particles are brought into contact with 20 ml of 1 N hydrochloric acid solution at room temperature for 15 minutes. Part of the solution is subsequently analysed for iron by means of suitable analytical techniques, for example ICP (inductively coupled plasma spectroscopy). The thickness of the outer shell is preferably 1-40 nm, particularly preferably 5-20 nm.

Figure 1:
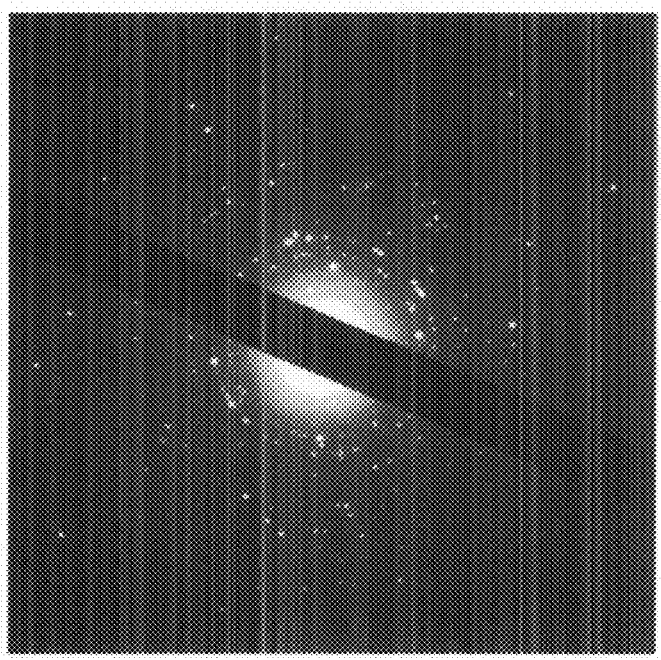
FIG. 1 shows typical electron diffraction rings of particles according to the invention.

The $B_{0.20\ nm}$ and $B_{0.25\ nm}$ values are obtained from the brightness of the Debye-Scherrer diffraction rings. The determination is carried out using the iTEM software from SIS. For this purpose, a rectangular valuation region is laid down. The height of the rectangle is selected so that the innermost and the outermost of the rings to be measured are present therein. The width and position of the rectangle are selected so that the approximately horizontal line component of the diffraction rings is evaluated. The arithmetic mean of the associated grey values of each line of the rectangle is determined by means of the software. The relative maxima of the grey value curve contain the brightness of the rings and the background at the respective position. Since the brightness of the background decreases with increasing radius, this has to be determined at the position of the rings. This is achieved by linear interpolation of the background grey values above and below the diffraction rings. The differences between the grey values of the peaks and the associated background values are the actual brightness values of the diffraction rings at the respective position. FIG. 1 shows typical electron diffraction rings of particles according to the invention. The lattice plane spacing 0.20 nm and 0.29 nm corresponds to maghemite and magnetite, while the lattice plane spacing 0.25 nm corresponds to maghemite, magnetite and haematite. Owing to the interfering brightness in the centre of the electron diffraction pattern, the ratio $B_{0.20\ nm}/B_{0.25\ nm}$ is most suitable for the quantitative determination. Furthermore, a person skilled in the art will see the high crystallinity of the particles of the invention from FIG. 1.

The determination of the ratio $B_{0.20\ nm}/B_{0.25\ nm}$ allows the relative composition of a mixture comprising haematite, magnetite and maghemite, which according to the technical object of the present invention ensures a high heating rate of the iron-silicon oxide particles, to be determined comparatively simply without the exact composition of this mixture being known.

If the absolute composition is nevertheless to be determined, this can be carried out by X-ray diffraction using Co—$K_\alpha$ radiation in an angle range 2Θ of 10-100°. Here, maghemite can be detected clearly by means of the reflections (110) and (211) in the front angle range. Hematite can be detected unambiguously because of the free-standing reflections. The quantitative phase analysis is carried out by the Rietveld method, with errors of about 10% relative. The core of the iron-silicon oxide particles of the invention preferably has a proportion of haematite of 20-60% by weight, particularly preferably 20-40% by weight, a proportion of magnetite of 25-<50% by weight, particularly preferably 30-45% by weight, and a proportion of maghemite of >30-60% by weight, particularly preferably 35-50% by weight, where the proportions add up to 100%. Small amounts of amorphous iron oxide can also be present.

Furthermore, it has been found to be advantageous for the heating rate for the crystallite diameter of haematite to preferably be 125-300 nm and very particularly preferably 150-250 nm.

In further preferred embodiments of the particles of the invention, the crystallite diameter of haematite and magnetite, independently of one another, is more than 120 nm, and that of maghemite is not more than 70 nm. The values here are obtained by the Debye-Scherrer method. Particular preference is given to an embodiment of the invention in which the crystallite diameter of haematite determined in this way is 125-300 nm, very particularly preferably 150-250 nm, that of magnetite is 150-350 nm, very particularly preferably 200-300 nm, and that of maghemite is 20-50 nm, very particularly preferably 35-45 nm.

Furthermore, it has been found that a further, partially or fully formed, inner shell which is located between core and outer shell and comprises the elements iron, silicon and oxygen and has a spacing of the lattice planes of 0.31+/−0.02 nm in the HR-TEM and a thickness of generally less than 2 nm has a positive influence on the heating rates.

The inner shell represents a transition region between amorphous silicon dioxide shell and crystalline iron oxide core which leads to excellent adaptation between core and outer shell. It is at present assumed that phonon transport and thus thermal conduction from core to outer shell are improved by means of this close bond, which can lead to substantially higher heating rates when the particles of the invention are being used.

The iron-silicon oxide particles of the invention preferably have a content of iron oxide, calculated as $Fe_2O_3$, of 60-95% by weight, preferably 75-90% by weight. The content of silicon dioxide is preferably 5-40% by weight, preferably 10-25% by weight. In addition, the iron-silicon oxide particles of the invention can additionally contain small proportions of impurities which originate from the starting materials and/or are process-related. In general, the proportion of impurities is not more than 1.5% by weight, preferably less than 1.0% by weight and particularly preferably less than 0.5% by weight.

The BET surface area of the particles is generally from 5 to 50 $m^2/g$. Preference is given to the range 10-30 $m^2/g$ and particularly preferably 15-20 $m^2/g$.

In general, the iron-silicon oxide particles of the invention are present as aggregates. The primary particles forming the aggregates can have grown together via the core and/or the outer shell. It is advantageous in terms of the heating rate for the average degree of branching of the aggregates to be at least 7, preferably 8-20 and particularly preferably 10-15. In addition, it can be advantageous for the average length of the branches of the aggregate to be at least 500 nm, preferably 700-2500 nm and particularly preferably from 1000 to 1500 nm. The determination of the degree of branching and the branch length is carried out by evaluation of transmission electromicrographs of about 700 aggregates at an enlargement of 50 000:1 by means of digital image analysis based on ASTM-3849 using the iTEM software from Olympus Soft Imaging Solutions GmbH.

In addition, the particles of the invention have hydroxyl groups on their surface. These can react with inorganic and organic surface modifying agents to form a Van der Waals interaction or an ionic or covalent bond and thereby modify the surface of the iron-silicon oxide particles of the invention. Suitable surface modifying agents are, for example, alkoxysilanes, carboxylic acids, nucleic acids or polysaccharides.

The invention further provides a process for producing the iron-silicon oxide particles of the invention, wherein
  a) in a first zone, zone 1, of a flow-through reactor, a mixture comprising
    a1) 0-30% of the total amount of one or more, preferably gaseous, hydrolysable and/or oxidizable silicon compounds,
    a2) one or more oxidizable and/or hydrolysable iron compounds which are preferably present in gaseous form or in the form of an aerosol obtained by atomization of one or more solutions,
    a3) one or more hydrogen-containing fuel gases and
    a4) one or more oxygen-containing gases
    is ignited and allowed to react,
  b) in a second zone, zone 2, of the flow-through reactor, 70-100% of the total amount of one or more, preferably gaseous, hydrolysable and/or oxidizable silicon compounds is added to this reaction mixture,
  c) in the third zone, zone 3, of the flow-through reactor, the reaction mixture is then optionally cooled, preferably by introduction of water, and the solid is then separated off from materials in gas or vapour form and the solid is then optionally treated with a surface modifying agent.

For the purposes of the present invention, the total amount is the sum of silicon compounds which are used in zone 1 and zone 2.

The process of the invention is characterized by, inter alia, not more than 30% of the total amount of the silicon compounds being used in zone 1. It has been found that the addition of the major or full amount of the silicon compound in zone 2 leads, firstly, to an impermeable, outer shell of silicon dioxide and, secondly, influences the proportions and the dimensions of the core constituents. It is in this way obviously possible to create optimal conditions in which magnetite and maghemite can ensure electromagnetic injection of energy and haematite can ensure thermal conductivity.

The thermal conductivity can be improved further when the reaction conditions are selected so that an inner shell is formed in addition to the outer shell.

The reaction conditions can preferably be selected so that the average residence time in zone 1 is 10 ms-1 s, particularly preferably 300-600 ms, and the temperature in zone 1 is preferably 900-1300° C., particularly preferably 950-1250° C., in each case measured 50 cm below the ignition point.

Furthermore, the reaction conditions can preferably be selected so that the average residence time in zone 2 is 0.1-10 s, particularly preferably 1.5-3.0 s, and the temperature in zone 2 is preferably 400-900° C., in each case measured 15 cm above the uppermost point of introduction in zone 2, particularly preferably 700-850° C.

Preference is given to an embodiment of the invention in which the silicon compound is added exclusively in zone 2. If silicon compounds are added in zone 1 and zone 2, these can be identical or different in zone 1 and zone 2. The silicon compound is preferably selected from the group consisting of $SiCl_4$, $CH_3SiCl_3$, $(CH_3)_2SiCl_2$, $(CH_3)_3SiCl$, $HSiCl_3$, $(CH_3)_2HSiCl$ and $CH_3C_2H_5SiCl_2$, $H_4Si$, $Si(OC_2H_5)_4$ and $Si(OCH_3)_4$. Particular preference is given to using $SiCl_4$ and/or $Si(OC_2H_5)_4$.

The iron compound is preferably introduced as an aerosol. In general, the aerosol is formed from an aqueous solution using an atomizing gas such as air or nitrogen and a two-fluid or multifluid nozzle. The average droplet diameter is preferably less than 100 μm, particularly preferably less than 50 μm. Iron(II) chloride is preferably used as iron compound.

In a particular embodiment of the invention, water or water vapour can be additionally introduced in zone 2. Here, the water or the water vapour is introduced separately from the silicon compound, preferably either shortly before or at the height of the feed point for the silicon compound. Preference is given to using a molar excess of water or water vapour. A molar ratio of water/silicon compound of 10-100 can be particularly preferred.

As fuel gases, preference is given to using hydrogen, methane, ethane and/or propane. Particular preference is given to hydrogen. Air or oxygen-enriched air is mainly used as oxygen-containing gas. In general, an excess of oxygen over hydrogen is used. Lambda, the ratio of the amount of fuel to the amount of oxygen, is preferably 1.05-1.50.

Figure 2:
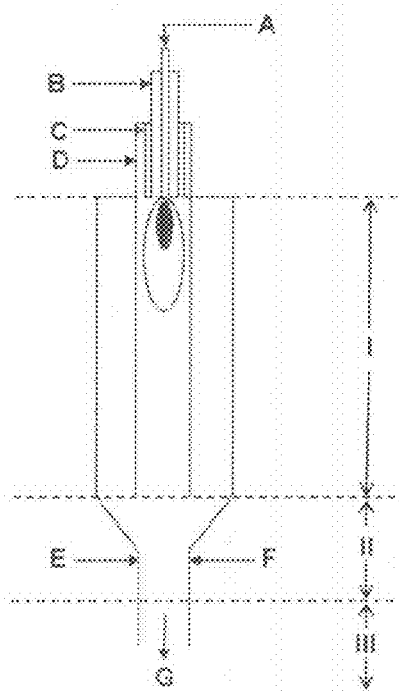
FIG. 2 schematically shows an embodiment of the process of the invention.

FIG. 2 schematically shows an embodiment of the process of the invention. Here:

A=aerosol composed of a solution of an iron compound and air or nitrogen
B=silicon compound and air or nitrogen
C=fuel gas
D=oxygen-containing gas
E=silicon compound and air or nitrogen
F=water vapour
G=cooling and deposition
1, 2, 3=zone 1, zone 2, zone 3

The invention further provides a silicone rubber containing the iron-silicon oxide particles of the invention. The proportion of these particles is preferably 0.5-15% by weight and particularly preferably 3-6% by weight.

The invention further provides for the use of the iron-silicon oxide particles of the invention as a constituent of rubber mixtures, of polymer preparations, of adhesive compositions, of moulded polymer composites which can be obtained by fusion in an alternating electromagnetic field and for producing dispersions.

EXAMPLES

Analytical Methods

The content of iron oxide is determined by digestion with NaOH, dissolution in dilute $H_2SO_4$ and subsequent iodometric titration.

The BET surface area is determined in accordance with DIN 66131.

The determination of the $B_{0.20\ nm}$ and $B_{0.25\ nm}$ values is carried out as described above.

The quantitative determination of the core components is carried out by X-ray diffraction. (Reflection, $\theta/\theta$-diffractometer, Co—K$\alpha$, U=40 kV, I=35 mA; scintillation counter, downstream graphite monochromator; angle range (2$\Theta$)/step width/measurement time: 10-100°/0.04°/6 s (4 h)).

Haematite is unambiguously identifiable because of the free-standing reflections. Maghemite can be detected clearly by the reflections (110) and (211) in the front angle range. A quantitative phase analysis is carried out by the Rietveld method (errors: about 10% relative). The quantitative phase analysis is carried out with the aid of Set 60 from the ICDD databank PDF4+ (2010). The quantitative phase analysis and the crystallite size determination are carried out using the Rietveld program SiroQuant®, version 3.0 (2005).

The fine structure of the included iron oxide phases and the silicon dioxide shell is determined by means of high-resolution transmission electron microscopy (HR-TEM). In addition, the crystallinity and phase composition are determined by means of electron diffraction analysis in the HR-TEM. The HR-TEMs and the electron diffraction patterns are recorded on a Jeol 2010F instrument at an acceleration voltage of 200 kV.

The thickness of the outer shell is determined by means of transmission electron microscopy (TEM). The lattice plane spacings of the inner shell are determined by means of high-resolution transmission electron microscopy (HR-TEM). The local element compositions are determined by means of flanking EDX spectra from nanospot analyses (lateral resolution about 3-4 nm).

The degree of branching and the branch length are determined by means of image analysis on about 700 aggregates from transmission electron micrographs. Degree of branching and branch length are evaluated by means of iTEM software from Olympus Soft Imaging Solutions GmbH. For this purpose, the skeletization is determined by recording of the end points by means of a morphological filter. The skeletization gives the degree of branching of the aggregate (number of end points per aggregate). Determination of the end points makes length determination for the aggregate possible.

The heating time to a temperature of 100° C. is determined in a silicone composition. The silicone composition is obtained by mixing 33 g of ELASTOSIL® E50, from Momentive Performance Materials, 13 g of silicone oil grade M 1000, from Momentive Performance Materials, 4 g of AEROSIL®150, from Evonik Degussa, and 2.5 g, corresponding to 4.76% by weight, of the product from Example 1 by means of a SpeedMixer for 2×30 sec. and 2×45 sec. at 3000 rpm. The silicone composition is then applied in a thickness of about 1 mm to a glass microscope slide. Energy is introduced by induction in an alternating magnetic field at a frequency of 40 kHz and an electric power of 1.9 kW.

Example 1

According to the Invention

Zone 1: A mixture of 0.10 kg/h of gaseous $SiCl_4$, an aerosol obtained by atomization of a 25% strength by weight aqueous solution of iron(II) chloride, corresponding to 0.88 kg/h, and 3 standard m³/h of nitrogen as atomizing gas at room temperature (23° C.) by means of a two-fluid nozzle, 8 standard m³/h of hydrogen and 20.2 standard m³/h of air is reacted in a first zone, zone 1. The average residence time of the reaction mixture in zone 1 is about 545 ms. The temperature 50 cm below the mouth of the burner is 1028° C.

Zone 2: A mixture of 0.26 kg/h of gaseous $SiCl_4$ together with 3 standard m³/h of nitrogen and, separately therefrom, 1 kg/h of hydrogen at the level of the feed point for the mixture of $SiCl_4$ and nitrogen is fed into the stream of the reaction mixture having a temperature of about 830° C. from zone 1. The average residence time of the reaction mixture in zone 2 is 1.9 s.

Zone 3: The reaction mixture is subsequently cooled and the solid obtained is separated from the gaseous materials on a filter.

The solid has an iron oxide content, calculated as $Fe_2O_3$, of 82% by weight. Its BET surface area is 19 m²/g.

The Debye-Scherrer evaluation gives $B_{0.20\ nm}$=586 and $B_{0.25\ nm}$=4024, and the ratio $B_{0.0\ nm}/B_{0.25\ nm}$ is thus 0.15.

The quantitative determination of the core substituents by means of X-ray diffraction indicates 35% by weight of haematite, 19% by weight of magnetite and 46% by weight of maghemite.

The determination of the crystallite sizes of the core constituents gives 225 nm for haematite, 168 nm for magnetite and 40 nm for maghemite.

Furthermore, the thickness of the shell is found to be about 6 nm. By means of image analysis, the average degree of branching is determined as 13 and the average branch length is determined as 1400 nm. The heating time is 4.7 s.

The Examples 2 to 5 according to the invention are carried out in a manner analogous to Example 1. The Comparative Examples 6 and 7 are carried out in a manner analogous to Example 1 but in Example 6 the total amount of the silicon compound is introduced in zone 1, and in Example 7 80% of the total amount of the silicon compound is introduced in zone 1. Table 1 shows the starting materials and reaction conditions for all examples. Table 2 shows the physicochemical data of the powders obtained from these examples.

The iron-silicon oxide particles according to the invention from Examples 1 to 5 display a significantly shorter heating time compared to the particles from Comparative Examples 6 and 7.

The particles of Examples 1 to 5 have a transition zone between core and outer shell. HR-TEMs show a lattice plane spacing of 0.31 nm in this transition zone, which differs significantly from the lattice plane spacing of a core constituent of 0.29 nm. The particles from Comparative Examples 6 and 7 do not display this transition zone.

the particle satisfies:

$B_{0.20\,nm}/B_{0.25\,nm}$ is $\leq 0.2$, $B_{0.20\,nm}$ is brightness of a Debye-Scherrer diffraction ring determined by electron diffraction at a lattice plane spacing of 0.20+/−0.02 nm, comprising maghemite and magnetite, $B_{0.25\,nm}$ is brightness of a Debye-Scherrer diffraction ring determined by electron diffraction at a lattice plane spacing of 0.25+/−0.02 nm, comprising maghemite, magnetite and haematite, and

TABLE 1

Starting materials and reaction conditions

| Example | | 1 | 2 | 3 | 4 | 5 | 6 | 7 |
|---|---|---|---|---|---|---|---|---|
| Zone 1 | | | | | | | | |
| FeCl$_2$ solution (25%) | kg/h | 3.50 | 5.00 | 3.5 | 3.0 | 2.5 | 7.0 | 4.0 |
| SiCl$_4$ | kg/h | 0.10 | 0.10 | 0 | 0.3 | 0.1 | 0.55 | 0.50 |
| Atomization gas | standard m$^3$/h | 3.0 | 3.0 | 4.0 | 3.5 | 4.0 | 5.0 | 4.0 |
| Hydrogen | standard m$^3$/h | 8.0 | 8.0 | 8.5 | 7.6 | 9.0 | 8.0 | 6.0 |
| Air | standard m$^3$/h | 20.2 | 21.0 | 22 | 19.5 | 24.5 | 10.0 | 16.0 |
| Temperature | °C. | 1028 | 1023 | 1047 | 1029 | 1062 | 903 | 989 |
| Average residence time | ms | 545 | 505 | 464 | 515 | 426 | | 652 |
| lambda | | 1.22 | 1.26 | 1.28 | 1.29 | 1.33 | 1.58 | 1.12 |
| Zone 2 | | | | | | | | |
| SiCl$_4$ | kg/h | 0.26 | 0.40 | 0.40 | 0 | 0.15 | 0 | 0.10 |
| Si(OC$_2$H$_5$)$_4$ | kg/h | 0 | 0 | 0 | 0.6 | 0 | 0 | 0 |
| Atomization gas | standard m$^3$/h | 3.0 | 3.0 | 2.5 | 3.0 | 3.0 | 0 | 3 |
| Water vapour | kg/h | 1 | 1 | 1.2 | 1.5 | 1 | 0 | 1 |
| Average residence time | s | 1.9 | 1.7 | 1.8 | 1.9 | 1.7 | 0.9 | 2.2 |
| Temperature | °C. | 827 | 841 | 836 | 889 | 897 | 836 | 915 |

TABLE 2

Physicochemical data of the powders

| Example | | 1 | 2 | 3 | 4 | 5 | 6 | 7 |
|---|---|---|---|---|---|---|---|---|
| Iron oxide | % by wt. | 82 | 82 | 81 | 63 | 82 | 85 | 75 |
| SiO$_2$ | % by wt. | 18 | 18 | 19 | 37 | 18 | 15 | 25 |
| BET surface area | m$^2$/g | 19 | 15 | 22 | 38 | 47 | 50 | 42 |
| $B_{0.20\,nm}$ | | 586 | 389 | 522 | 644 | 1507 | 1266 | 1133 |
| $B_{0.25\,nm}$ | | 4024 | 1925 | 4177 | 3812 | 7734 | 3742 | 2484 |
| $B_{0.20\,nm}/B_{0.25\,nm}$ | | 0.15 | 0.20 | 0.12 | 0.17 | 0.19 | 0.34 | 0.46 |
| Components of core | | | | | | | | |
| haematite | % by wt. | 35 | 41 | 24 | 29 | 30 | 9 | 15 |
| magnetite | % by wt. | 19 | 16 | 45 | 17 | 41 | 42 | 26 |
| maghemite | % by wt. | 46 | 43 | 31 | 54 | 29 | 9 | 49 |
| Crystallite sizes in core | | | | | | | | |
| haematite | nm | 225 | 133 | 130 | 280 | 178 | 85 | 50 |
| magnetite | nm | 168 | 230 | 195 | 352 | 219 | 18 | 22 |
| maghemite | nm | 40 | 36 | 45 | 40 | 48 | 36 | 35 |
| Degree of branching | | 13.2 | 9.8 | 20.4 | 11.9 | 8.4 | 5.2 | 5.9 |
| Branch length | nm | 1402 | 959 | 2338 | 1342 | 1051 | 393 | 429 |
| Thickness of outer shell | nm | 6 | 6 | 5 | 7 | 4 | 2-6 | 4-10 |
| Heating time | s | 4.7 | 4.2 | 5.3 | 7.3 | 6.8 | 14.2 | 9.8 |

The invention claimed is:

1. An iron-silicon oxide particle, comprising:
 a core and
 an outer shell,
 wherein the core comprises maghemite, magnetite, and haematite, as iron oxide modifications,
 the outer shell consists essentially or exclusively of amorphous silicon dioxide,
 a crystallite diameter of the haematite determined by X-ray diffraction is greater than 120 nm.

2. The iron-silicon oxide particle according to claim 1, wherein a crystallite diameter of haematite and a crystallite diameter of magnetite are each independently more than 120 nm and
 a crystallite diameter of maghemite is not more than 70 nm.

3. The iron-silicon oxide particle according to claim 1, further comprising a partially or fully formed inner shell between the core and the outer shell,
wherein the inner shell comprises iron, silicon, and oxygen,
the inner shell has a spacing of lattice planes of 0.31+/−0.02 nm in HR-TEM, and
the inner shell has a thickness of less than 2 nm.

4. The iron-silicon oxide particle according to claim 1, wherein an iron oxide content of the particle, calculated as $Fe_2O_3$, is from 60 to 95% by weight.

5. The iron-silicon oxide particle according to claim 1, wherein a BET surface area of the particle is from 5 to 50 $m^2/g$.

6. The iron-silicon oxide particle according to claim 1, wherein an average degree of branching of aggregates is at least 7.

7. The iron-silicon oxide particle according to claim 6, wherein an average length of branches of an aggregate is at least 500 nm.

8. The iron-silicon oxide particle according to claim 1, obtained by a process comprising modifying by adsorption, reaction on a surface, or complexation of or with organic and inorganic reagents.

9. A process for producing the iron-silicon oxide particle of claim 1, the process comprising:
igniting and reacting a mixture comprising from 0 to 30% of a total amount of at least one hydrolysable or oxidizable or both hydrolyzable and oxidizable silicon compound, an oxidizable or hydrolysable or both oxidizable and hydrolyzable iron compound, a hydrogen-containing fuel gas, and an oxygen-containing gas in a first zone of a flow-through reactor,
adding from 70-100% of the total amount of at least one hydrolysable or oxidizable or both hydrolyzable and oxidizable silicon compound to the mixture in a second zone of the flow-through reactor, then
optionally cooling the mixture in a third zone of the flow-through reactor,
separating off a solid from gaseous or vaporous material in the third zone of the flow-through reactor, and
optionally treating the solid with a surface modifying agent in the third zone of the flow-through reactor.

10. The process according to claim 9, wherein an average residence time in the first zone is from 10 ms to 1 s and a temperature in the first zone is from 800 to 1300° C.

11. The process according to claim 9, wherein an average residence time in the second zone is from 0.1 to 10 s and a temperature in the second zone is from 400 to 800° C.

12. The process according to claim 9, wherein adding the at least one silicon compound is exclusively in the second zone.

13. The process according to claim 9, wherein the at least one silicon compound is at least one selected from the group consisting of $SiCl_4$, $CH_3SiCl_3$, $(CH_3)_2SiCl_2$, $(CH_3)_3SiCl$, $HSiCl_3$, $(CH_3)_2HSiCl$ and $CH_3C_2H_5SiCl_2$, $H_4Si$, $Si(OC_2H_5)_4$, and $Si(OCH_3)_4$.

14. The process according to claim 9, further comprising introducing water or water vapor in the second zone.

15. A dispersion, comprising the particle of claim 1.

16. A silicone rubber comprising the iron-silicon oxide particle according to claim 1.

17. A rubber mixture, polymer preparation, adhesive composition, or molded polymer composite, comprising the particle of claim 1.

18. A process of manufacturing a rubber mixture, polymer preparation, adhesive composition, or molded polymer composite, the process comprising manufacturing the rubber mixture, polymer preparation, adhesive composition, or molded polymer composite with the particle of claim 1 by fusion in an alternating electromagnetic field.

* * * * *